3,231,349
PRODUCTION OF VITREOUS FIBER PRODUCTS
Joseph P. Stalego, Newark, Ohio, assignor to Owens-Corning Fiberglas Corporation, a corporation of Delaware
No Drawing. Filed Nov. 21, 1960, Ser. No. 70,393
7 Claims. (Cl. 65—3)

This invention relates to the production of vitreous fiber products having minimum odor, and, more particularly, to wool-like and board-like masses of glass or other vitreous fibers wherein individual fibers are bonded to one another at points of contact with a resite or hardened phenolic binder produced by cure of a resole, and wherein odors which are characteristic of such products are minimized or eliminated altogether. Various wool-like and board-like products have heretofore been made from masses of vitreous fibers which are bonded together at points of contact by a resite. Such products have found widespread use in various insulating applications, for example in buildings and vehicles, as well as in various appliances, and, in many instances, are used as combined insulation and decoration. It has been found, however, that unpleasant odors are frequently associated with such products, and particularly when binders consisting essentially of resoles are formulated to have sufficient flow to be satisfactory for use with fibers of a comparatively small average diameter, for example about 25 hundred thousandths of an inch or less.

The instant invention is based upon the discovery that odors associated with wool-like and board-like vitreous fiber products wherein individual fibers are bonded to one another at points of contact by a resite can be minimized or eliminated altogether by selection of a proper phenolic binder composition and by cure of the composition under such conditions that the "Gel Time" thereof, determined as subsequently discussed in detail, is at least about 150 seconds. The invention is also based upon the discovery of various ways for controlling the "Gel Time" of a phenolic resole binder composition.

The "Gel Time" of a phenolic resole, as the term is used herein and in the appended claims, is the time required, under a given set of curing conditions, for the resole to gel and cure to such an extent that it is non-adherent. A convenient measure of gel time involves placing a resole sample on a hot plate maintained at 300° F. and determining the time required for gelling and curing to such an extent that the sample adheres to a spatula, when patted therewith, and forms fibers.

It is, therefore, an object of the invention to provide an improvement in a method for producing masses of intermeshed glass or other vitreous fibers.

It is a further object of the invention to provide such an improvement by virtue of which odors that are frequently associated with such products are minimized or eliminated altogether.

It is still another object of the invention to provide an improvement in such a method which involves the selection of a particular binder composition and the cure thereof, while associated with glass or other vitreus fibers, under temperature conditions which cooperate with the selected binder composition to extend the gel time thereof as cure progresses.

Other objects and advantages will be apparent from the description which follows, which is intended only to illustrate and disclose the invention, and in no way to constitute a limitation thereon.

According to the invention an improvement is provided in a method for producing a mass of intermeshed vitreous fibers. Such method includes the steps of flowing streams of a fluid, vitreous material through orifices, extending the streams longitudinally to cause attenuation thereof into fibers, projecting the fibers through an enclosed zone, associating a binder with the projected fibers in the enclosed zone, collecting the fibers and associated binder on a foraminous conveyor, and conveying the fibers and associated binder through a heated curing oven to effect cure of the binder. The improvement according to the invention involves the use, as the binder in such method, of a composition which consists essentially of an aqueous dispersion of a phenolic resole having a gel time at a predetermined temperature of at least about 150 seconds, and controlling the curing temperature to one within about 50° F. of a temperature at which the resole has the said gel time. The steps of flowing streams of a fluid, vitreous material through orifices, usually disposed in the bottom of a melting tank, extending the streams longitudinally to cause attenuation thereof into fibers, for example by means of a blast of steam or of another compressible fluid, or a blast of hot combustion products from a burner, projecting the fibers through an enclosed zone, associating a binder with the projected fibers in the enclosed zone, collecting the fibers and associated binder on a foraminous conveyor, and conveying the fibers and associated binder through a heated curing oven to effect cure of the binder are well known in the art. They are described in numerous issued patents and in other references, and need not be described herein detail. The problem of odor, to which the instant invention is directed, is particularly acute with binder formulations which bond satisfactorily when the fibers have an extremely small average diameter, as is the case with fibers produced by certain presently known centrifugal methods.

As has been indicated above, the instant invention contemplates a cooperation between a particular binder composition and a curing temperature so that the gel time of the binder is at least about 150 seconds. Such a gel time can be achieved by control of the binder composition pH in cooperation with curing temperature. It has been determined that, for any binder composition which consists essentially of an aqueous dispersion of a phenolic resole and a pH control medium, gellation occurs, at any given temperature, after a time which is a function of the pH at which the composition is maintained by the control medium. This phenomenon can be demonstrated by adding varying amounts of maleic acid or of maleic anhydride to each of several samples of a substantially neutral phenolic resole dispersion, and then adding ammonium hydroxide to each of the samples to bring the pH thereof within the range of 6 to 9 and measuring the gel time of each of the samples. Samples to which only a small amount of maleic acid or anhydride has been added have a comparatively short gel time, although not quite as short as the resole to which no maleic acid or anhydride has been added. Samples to which increasingly larger quantities of maleic acid or anhydride have been added show increasingly longer gel times until a maximum is reached, and beyond such maximum progressively larger amounts of maleic acid or anhydride cause progressively shorter gel times. In one aspect, the instant invention contemplates the use as a binder, as described, of an aqueous dispersion which consists essentially of a phenolic resole, maleic acid or anhydride or its equivalent and ammonium hydroxide or its equivalent, and in proportions such that the maleic acid, anhydride or equivalent is effective to maintain the dispersion, at curing temperatures, at a pH at which the gel time thereof is at least about 150 seconds, while the ammonium hydroxide or equivalent is effective to maintain the dispersion, under ambient conditions and before heating to a curing temperature, at a pH from about 6 to about 9. It has been found that the ammonium maleate which is formed in the aqueous dispersion is decomposed at suitable curing temperatures from about 230° F. to about 350° F., ammonium cations being volatilized, with the result that the maleic acid, anhydride or equivalent is the effective pH control medium during curing, and maintains the resole at a pH from about 4 to 5 at which the gel time is at least about 150 seconds. It has been determined that, with a particular phenolic resole, which is subsequently identified in detail, and hereinafter referred to as "Resole A," adding thereto 3 percent of maleic anhydride, based upon total resin solids, increases the gel time thereof from about 100 to about 150 seconds. It has also been found that about 3 percent of maleic anhydride, based upon total resin solids, added to a different phenolic composition, subsequently identified in detail, and hereinafter referred to as "Resole B," increases the gel time thereof from about 150 seconds to about 200 seconds. It has also been found that a binder composition consisting essentially of Resole B is superior to one consisting essentially of Resole A, from the standpoint of odor from inter-meshed vitreous fiber products with which the resole binders are used, and that adding 3 percent of maleic anhydride, on the indicated basis, to the binder composition consisting essentially of Resole A makes that composition substantially equivalent to the composition which consists essentially of Resole B. The binder composition consisting essentially of Resole B is also correspondingly improved by the addition of about 3 percent of maleic anhydride.

The terms "percent" and "parts" are used herein, and in the appended claims, to refer to percent and parts by weight, unless otherwise indicated.

It has also been determined that acid reacting materials other than maleic anhydride can be used to control the pH of a phenolic resole binder composition when pH control is employed to determine gel time. Saturated and ethylenically unsaturated dicarboxylic acids constitute a preferred class of pH control agents. Such acids are particularly effective relative to the required pH control because of their dibasic nature. Best results have been achieved with saturated dicarboxylic acids which are members of the homologous series from oxalic through sebacic and isomers of acids of such homologous series. Maleic acid or anhydride, fumaric acid, and homologs of maleic acid and fumaric acids having not more than 10 carbon atoms are most desired for pH control because they are capable of cross-linking resole molecules by combined esterification and addition polymerization. Excellent results have also been achieved using various acid-reacting alkyd resins for pH control. For example, alkyds produced from a glycol or mixture of glycols and maleic acid or anhydride, fumaric acid, phthalic acid or anhydride or the like, in proportions of from about 0.9 mol to about 1.1 mols of the glycol or glycols per mol of the acid or acids, and by esterification to an acid number from about 25 to about 75 give excellent results. In addition, alkyds of the indicated type to which boric acid has been added, or with which boric acid has been reacted have also been used, both alone and in combination with other acid reacting materials to achieve the required pH during cure. Alkyds, when used, must be water dispersable, and preferably are themselves aqueous dispersions which can be produced in a well-known manner by emulsion esterification. Terephthalic, formic, acetic, propionic, n-butyric, isobutyric and n-valeric acids, and phthalic acid and anhydride can also be used for pH control, but are slightly less desirable than the dicarboxylic acids discussed above.

It is also possible to employ high boiling mineral acids to accomplish pH control during cure of a resole binder composition as described above. For example, a dilute solution of sulfuric acid or of phosphoric acid can be mixed with a binder composition in the proportion required to achieve a desired pH at which the gel time of the composition is at least 150 seconds, and the resulting binder composition can be employed in the production of an intermeshed vitreous fiber product having no odor or minimum odor. However, such a binder composition is comparatively unstable under ambient conditions, can be stored for only comparatively short periods of time, and cannot be pumped significant distances unless a regular maintenance program is established to eliminate crystals and precipitation which occur in the lines. As a consequence, such a procedure necessitates either a final mixing step immediately prior to use of the binder composition or a costly maintenance program. Other procedures, which do not necessitate either such expedient, and which will subsequently be discussed in more detail, are, therefore, preferred.

It has been found that an aqueous dispersion of a resole, to be stable under ambient conditions, must be maintained at a pH from about 6 to about 9. When maintained at a pH within such range, the resole can be stored for extended periods of time, and can be pumped through comparatively long runs of piping without appreciable crystallization or precipitation. When one of the previously identified organic acid-reacting materials has been employed for pH control in a binded composition, such composition can subsequently be neutralized to a pH from about 6 to about 9 simply by adding ammonium hydroxide thereto. So neutralized, the binder is stable for extended periods of time under ambient conditions, and can be pumped from a central binder formulating region of a plant facility to various other regions where the binder is required. However, when the neutralized binder is associated with glass or other vitreous fibers and conveyed through a suitable curing oven, as described above, ammonia is vaporized with the result that the pH of the binder composition is lowered to that predetermined by the amount of the organic acid-reacting material initially employed. As a consequence, the net effect of the ammonium hydroxide or the like and of the maleic anhydride or the like is to maintain the binder composition at a pH within the range required for stability under ambient conditions and then, during cure, to lower the pH to one at which the gel time is at least 150 seconds, so that unpleasant odors are eliminated, or at least minimized. Accordingly, since there is a simple solution to the problem of providing stability under ambient conditions and the required pH control during curing, so long as one of the indicated organic acid-reacting materials is employed, the use of mineral acids is less desirable. This is particularly true because ammonium sulfate and ammonium phosphate, which would ordinarily be the preferred mineral acid salts for pH control, do not decompose thermally at a temperature sufficiently low to provide the required lower pH during curing, ammonium sulfate, for example, having no appreciable effect on gel time of a resole binder composition.

It has also been found that an aqueous dispersion of a resole produced from formaldehyde and phenol, for example, in mol ratios ranging from about 1.6 to about 2.0 has a prolonged gel time, by comparison with similar resoles wherein the mol ratio of formaldehyde to phenol is higher than 2. For example, an aqueous dispersion of a resole produced from formaldehyde and phenol in a mol ratio of substantially 1.8:1, when diluted with water to form a binder composition, had a gel time of substantially 150 seconds and, when used as described above, produced an inter-meshed glass fiber product which showed a significantly decreased odor level by comparison with an identical product produced from the binder composition including a resole produced from formaldehyde and phenol in a mol ratio of 2.3:1. It has further been found that the indicated low formaldehyde resole is subject to improvement in the manner previously described by pH control. For example, when 3 percent of maleic anhydride was added thereto, based upon total resin solids, and the binder composition was neutralized with ammonium hydroxide to a pH of substantially 8, the gel time was extended to about 200 seconds, and the odor level was still further decreased when such composition was used in producing an intermeshed glass fiber product. For optimum results, the resole should include substantially one mol of phenol reacted or condensed with 1.5 mols of formaldehyde.

The use of glucose and other high temperature anti-oxidants has also been found to be beneficial, relative to odor control, at least when incorporated in a binder compoistion having a gel time of at least 150 seconds. Most desirable binder compositions according to the invention, therefore, include from about 1 percent to about 10 percent of a high temperature anti-oxidant such as glucose. Maleic and fumaric acids, maleic anhydride, and homolog thereof are also beneficial because of their effectiveness as anti-oxidants during curing.

The following examples are presented solely for the purpose of further illustrating and disclosing the invention, and are in no way to be construed as limitations thereon.

EXAMPLE 1

A binder composition consisting essentially of an aqueous dispersion of a phenolic resole and a pH control medium was produced according to the following procedure:

A mixing tank provided with a propeller-type agitator was charged with 1600 gallons of water, and the water and subsequently charged ingredients were stirred during the formulation of the binder composition. A 12 ounce portion of gamma-aminopropyltriethoxysilane was then added, followed by 15 gallons of 28 percent ammonium hydroxide, 5 gallons of "Maleic Sirup A" [1], 200 gallons of Resole A and 15 gallons of Oil Emulsion A (subsequently identified). Agitation was continued for 5 minutes after the oil emulsion addition to assure substantial uniformity of the completed binder composition.

The binder composition produced as described in the preceding paragraph was sprayed into a forming hood through which glass fibers were being projected onto a foraminous conveyor. The fibers were collected in the form of a wool-like mass associated with the binder composition. The relative proportions of binder composition and fibers were such that the binder, after cure thereof, constituted substantially 3 percent of the total wool-like mass. Cure was accomplished in an oven maintained at a temperature of about 350° F. through which the glass fibers and associated binder were passed in a period of about 5 minutes. Samples of the resulting wool-like mass were placed in metal containers above a quantity of distilled water and conditioned for several hours, after which time they were examined for odor by a panel of experts, and were ranked relative to an arbitrary scale ranging from one for no detectable odor through five for a strong, unpleasant odor. The median odor rating was slightly higher than two. When the procedure was repeated, except that the Maleic Sirup A was omitted, the median odor rating was just below three, with numerous individual readings as high as four and some as high as five. This latter procedure is not in accordance with the instant invention, and is described only to provide a comparison.

Maleic Sirup A was prepared by charging a jacketed vessel provided with a propeller-type agitator with 12 gallons of water, and circulating cold water through the jacket of the vessel, while adding to the water within the vessel, with agitation, 25 gallons of 28 percent ammonium hydroxide, 15 gallons of corn sirup and 75 pounds of maleic acid.

Resole A was prepared by charging a reaction vessel with 1100 gallons of 100 percent phenol, 1460 gallons of 52 percent formaldehyde solution in water, 176 gallons of water, 875 gallons of a polyoxyethylene glycol having a molecular weight of about 600, 315 pounds of sodium hydroxide, and heating the resulting charge for a total of seven hours, during which time it was stirred by a propeller-type agitator. The charge was first heated to 110° F., and maintained at about such temperature for approximately 2 hours, and was then heated to and held at approximately 140° F. for an additional 5 hours. The resulting resole was then cooled to 100° F. and neutralized to a pH of 7.3 by adding 75 gallons of 20 percent sulfuric acid thereto.

Resole B was produced according to the procedure described in the preceding paragraph except that the charge included 336 gallons of water and only 1140 gallons of 52 percent formaldehyde solution.

Oil Emulsion A is prepared by emulsifying 90 parts of mineral oil with 100 parts of water, using, as surfactants for the emulsification, 7 parts of an isooctyl phenyl polyethoxy ethanol and 3 parts of an oil cut, synthetic petroleum sulfonate having a molecular weight of approximately 50.

Resole A was found to have a gel time of 100 seconds; Resole B a gel time of 150 seconds; Resole A plus 2½ percent by volume of Maleic Sirup A a gel time of 150 seconds; and Resole B plus 2½ percent by volume of Maleic Sirup A a gel time of 200 seconds.

EXAMPLE 2

Various other binder compositions have been formulated and used as described above in Example 1 in practicing the instant invention. Preferred ones of such binder formulations are identified in the following table:

[1] Maleic Sirup A is subsequently identified herein.

*Table I*

| Binder Identification | Resin Dispersion | | Water, gallons | Gamma-aminopropyltri-ethoxy silane, ounces | 28% NH₄OH, gallons | Maleic Sirup A, gallons | Oil Emulsion A, gallons |
|---|---|---|---|---|---|---|---|
| | Identity | Quantity, gallons | | | | | |
| No. I [1] | Resole B | 200 | 1,600 | 12 | 15 | 5 | 15 |
| No. II | ---do--- | 200 | 1,600 | 12 | 15 | | 15 |
| No. III | Resole C [2] | 200 | 1,600 | 12 | 15 | | 15 |
| No. IV | Resole D [2] | 200 | 1,600 | 12 | 15 | | 15 |
| No. V [3] | ---do [2]--- | 200 | 1,600 | 12 | 15 | 5 | 15 |
| No. VI | Resole E [2] | 200 | 1,600 | 12 | 15 | 5 | 15 |

[1] The use of this composition as described above constitutes the best presently known mode of practicing the invention to produce vitreous fiber products for application at temperatures of about 300° F. and lower.
[2] Subsequently identified.
[3] The use of this composition as described above constitutes the best presently known mode of practicing the invention to produce vitreous fiber products for applications at temperatures above about 300° F.

Median odor ratings were then determined for samples of the resulting wool-like products. These ratings are presented in the following table:

*Table II*

| Binder identification: | Median odor level when cured on glass fiber wool |
|---|---|
| I | Slightly lower than two. |
| II | Slightly higher than two. |
| III | Slightly higher than two. |
| IV | Slightly higher than two. |
| V | Slightly lower than two. |
| VI | Slightly higher than two. |

Resole C was prepared by charging a reaction vessel with 172 pounds of 100 percent phenol, 200 pounds of a 52 percent formaldehyde solution in water, 31 pounds of water, and 25.8 pounds of barium octahydrate, and heating the resulting charge for a total of 4 hours, during which time it was stirred by a propeller-type agitator. The charge was first heated to 110° F., and maintained at about such temperature for approximately 2 hours, and was then heated to and held at approximately 140° F. for an additional 2 hours. The reaction mixture was then cooled to approximately 100° F., and neutralized with 20 percent sulfuric acid to a pH of about 7.5. A 22 pound portion of melamine was then added to the reaction mixture, and the resulting charge was heated to and maintained at a temperature of about 140° F. for an additional 1½ hours. Heating was then discontinued and the resole, after cooling to about 100° F., was neutralized with 20 percent sulfuric acid to a pH of about 7.2.

Resoles D and E were also produced in the manner described in the preceding paragraph, but from different charges. The charges used in producing each of these resoles are set forth in the following table:

*Table III*

[Charge in pounds]

| | Phenol | 52% formaldehyde solution | Water | Barium octahydrate | Melamine | Dicyandiamide |
|---|---|---|---|---|---|---|
| Resole D | 172 | 200 | 31 | 25.8 | ---------- | 15 |
| Resole E | 172 | 242 | ---------- | 25.8 | ---------- | 15 |

The gel times for Resoles C, D and E were determined, as well as the gel time for Resole D plus 2½ volume percent of Maleic Sirup 1. These gel times are presented in the following table:

*Table IV*

| Composition: | Gel time |
|---|---|
| Resole C | 197 |
| Resole D | 163 |
| Resole D plus Maleic Sirup 1 | 173 |
| Resole E | 175 |
| Resole E plus Maleic Sirup 1 | 178 |

Other binder compositions have also been employed in the production of intermeshed glass fiber products in the manner described above. Examples of additional ones of such compositions which showed significant improvement relative to odor level by comparison with conventional binder compositions are presented in Table V, below. In all cases, the median odor level was slightly higher than two, although in some cases it was also slightly higher than when the previously identified most desired compositions were employed.

*Table V*

| Binder Identification | Resin Dispersion Identity | Resin Dispersion Quantity, lbs. | Gamma-Amino-Propyl-triethoxy Silane, grams | 28% NH₄OH, quarts | Oil Emulsion, lbs. | Acid-reacting Identity | Material Quantity, lbs. | Water |
|---|---|---|---|---|---|---|---|---|
| VII | Resole B | 50¾ | 19 | 1½ | 13¼ | Alkyd Resin A | 2½ | To make 100 gallons. |
| VIII | Resole C | 50¾ | 19 | 1½ | 13¼ | Alkyd Resin B | 2½ | Do. |
| IX | Resole D | 50¾ | 19 | 1½ | 13¼ | Alkyd Resin B + maleic anhytride. | 2½ | Do. |
| X | Resole B | 50¾ | 19 | 1½ | 13¼ | Phthalic anhytride. | 1½ | Do. |
| XI | do | 50¾ | 19 | 1½ | 13¼ | Acetic acid | ½ | Do. |
| XII | do | 50¾ | 19 | 1½ | 13¼ | Oxalic acid | ½ | Do. |

The gel time for each of the above binder compositions is given in the following table:

*Table VI*

| Binder identification: | Gel time |
|---|---|
| VII | 277 |
| VIII | 176 |
| IX | 180 |
| X | 271 |
| XI | 247 |
| XII | 300 |

Alkyd Resin A is prepared by mixing 20.8 parts of maleic acid with 4.7 parts of ethylene glycol, 24 parts of pentaerythritol and 1.26 parts of boric acid in a glass reaction vessel, adding a sufficient amount of water to obtain a slurry, flushing air from the reaction vessel with nitrogen, and heating the mixture in the vessel to 150° C. and maintaining it at approximately such temperature until the acid number thereof is substantially 40. Water is then mixed with the reaction products to provide a 15 percent solids material. Alkyd Resin B is prepared in the same way, except that boric acid is omitted from the charge.

It will be noted that gamma-aminopropyltriethoxysilane and an oil emulsion, specifically Oil Emulsion A, were used in each of the binder compositions identified above, and that a polyoxyethylene glycol was used in the production of some of the resoles described. It has been found that none of these materials, in the proportions used, as described herein, detectably affects the odor of glass or other vitreous fiber products with which a binder composition is used, but that each has a different beneficial characteristic. For example, the silane improves the fiber-resite bond strength under humid or wet conditions, and the oil emulsion tends to counteract a brashy feel which is characteristic of many such products. It has also been found that various extenders, some of which are reactive with resoles, can be used at least to a limited extent with binder compositions which are effective to produce glass or other vitreous fiber products having reduced odor in accordance with the invention. For example, limited amounts of a pinewood pitch extract or of a tall oil pitch can be employed. A particularly advantageous pine wood pitch extract is in the form of an aqueous emulsion, 40 percent solids, of the resinous material which can be isolated as described in U.S. Patent 2,391,368 (page 2, column 1, lines 34 and following). Such an extract having the following analysis is commercially available:

| | Percent |
|---|---|
| High melting furfural condensate (methanol insoluble) | 6 |
| Neutral oils (hydrocarbons, esters and ethers) | 4 |
| Rosin | 9 |
| Belro - phenol - lactone (probably $C_{18}H_{14}O_3 \cdot 2(OCH_3OH)$) | 5 |
| Flavone type polyphenol (possibly about $C_{15}H_7O_2 \cdot 3OH$) | 5 |
| Fumic acid type compound | 2 |
| Pectic acid type compound | 0.2 |
| Air oxidized rosin acid (unfused) | 6 |
| Strongly acidic compound | 3 |
| Weakly acidic, high melting phenolic compound | 38 |
| Relatively neutral phenol ethers and esters | 19 |
| Water soluble carbohydrates, etc. | 1 |

It has been found that tall oil pitches having a flash point from 400° F. to 550° F. are also suitable reactive extenders. Tall oil is a by-product of the paper making industry; tall oil pitch is a commercially available residue left after distillation of crude tall oil to recover rosin acids and tall oil fatty acids. Tall oil pitches have the following properties:

| | |
|---|---|
| Acid number | 40–160 |
| Percent rosin acids | 0.5–20 |
| Percent fatty acids | 7–80 |
| Saponification number | 115–165 |
| Percent unsaponifiables | 20–35 |
| Flash point ° F. | 325–600 |

In general, a pitch can be identified by its flash point, which varies as a direct function of percent rosin acids and as an inverse function of percent fatty acids.

It will be apparent that various other fillers, extenders, or the like, which do not appreciably affect the odor of the final product can also be employed in a similar manner.

It will be apparent from the foregoing discussion and examples that considerable latitude with respect to the identity of the resole used in practicing the instant invention is possible. For example, the initial proportions of phenol to formaldehyde can be varied within considerable limits, and the resoles can be modified by reaction with melamine, dicyandiamide, or other amino-type materials which react with formaldehyde to produce resins by condensation. In addition, at least limited amounts of aldehydes other than formaldehyde, e.g., furfural, or of substituted phenols, or of both, can be employed. It has been found to be preferred that the resole be one of at least a certain predetermined minimum degree of condensation because, otherwise, excessive amounts of the resole are lost during cure, with the result that unnecessarily large amounts thereof must be employed to achieve a desired or required binder to fiber ratio. It has also been determined that the degree of condensation of a resole can be ascertained by finding the infra-red absorbence of a sample thereof at 8.70 microns wave length, and dividing such absorbence by the absorbence of that sample at 6.60 microns wave length. When a resole has the degree of condensation preferred for use in accordance with the instant invention, such quotient is at least 1.1. Preferred resoles for use according to the invention also must be dilutable with water to an extent desired for application to a glass fiber product. Such concentration varies from about 3 percent solids to about 30 percent solids, depending upon the product desired and the ambient conditions under which the binder is applied. Since the dilutability of a phenolic resole is an inverse function of degree of condensation, preferred resoles are condensed until the aforesaid quotient is at least 1.1, but condensation is stopped while the resole has a sufficiently high dilutability that a solution of from about 3 percent to about 30 perecnt solids can be produced.

It will be apparent that various changes and modifications can be made from the specific details discussed herein and recited in the examples hereof without departing from the spirit and scope of the invention as defined in the appended claims.

What I claim is:

1. In a method for producing a mass of intermeshed vitreous fibers which includes the steps of flowing streams of a fluid, vitreous material through orifices, extending the streams longitudinally to cause attenuation thereof into fibers, projecting the fibers through an enclosed zone, associating a binder with the projected fibers in the enclosed zone, collecting the fibers and associated binder on a foraminous conveyor, and conveying the fibers and associated binder through a heated curing oven to effect cure of the binder, the improvement of using, as the binder, a composition which consists essentially of an aqueous dispersion of a phenolic resole which is the product of the condensation of from substantially 1.6 to 2.3 mols of formaldehyde with 1 mol of phenol and a pH control medium which includes a volatile amine and a less volatile acid-reacting material and which is effective under ambient conditions to maintain the composition at a pH from about 6 to about 9, but from which the amine is vaporized, when the composition is heated to a curing temperature, whereby the acid-reacting material maintains the composition at a lower pH during curing thereof, and controlling the curing temperature to one within about 50° F. of a temperature at which the composition has a gel time of at least about 150 seconds.

2. In a method as claimed in claim 1, the improvement wherein the amine is ammonia.

3. In a method as claimed in claim 2, the improvement wherein the acid-reacting material is an ethylene, alpha, beta-dicarboxylic acid having 4 carbon atoms.

4. In a method as claimed in claim 3, the improvement wherein the dicarboxylic acid is maleic acid.

5. In a method as claimed in claim 4, the improvement wherein the composition also contains glucose in an amount of about 1 to 10%.

6. In a method as claimed in claim 3, the improvement wherein the phenolic resole is the product of the condensation of from substantially 1.6 to 2.0 mols of formaldehyde with 1 mol of phenol.

7. In a method as claimed in claim 6, the improvement wherein the curing temperature is of the range of about 230° F. to 350° F.

References Cited by the Examiner

UNITED STATES PATENTS

| 1,720,052 | 7/1929 | Norton | 260—59 |
|---|---|---|---|
| 1,756,252 | 4/1930 | Lougovoy | 260—45.1 |
| 1,959,433 | 5/1934 | Loetscher | 260—17.25 |
| 2,452,005 | 10/1946 | Weltman et al. | 260—59 |
| 2,465,299 | 3/1949 | Wachter | 154—140 |
| 2,482,525 | 9/1949 | Wachter | 260—59 |
| 2,604,427 | 7/1952 | Armstrong | 154—28 |
| 2,758,101 | 8/1956 | Shappell | 154—43 |
| 2,990,307 | 6/1961 | Stalego | 154—140 |

FOREIGN PATENTS 714,388  9/1931  France.

EARL M. BERGERT, *Primary Examiner.*

CARL F. KRAFFT, *Examiner.*